United States Patent [19]

Mayer et al.

[11] 4,292,171
[45] Sep. 29, 1981

[54] MAGNETICALLY STABILIZED, FLUIDIZED BEDS

[75] Inventors: Francis X. Mayer; William F. Arey, Jr., both of Baton Rouge, La.

[73] Assignee: Exxon Research & Engineering Co., Florham Park, N.J.

[21] Appl. No.: 131,853

[22] Filed: Mar. 19, 1980

Related U.S. Application Data

[63] Continuation of Ser. No. 737,228, Nov. 1, 1976, abandoned.

[51] Int. Cl.³ .................... C10G 11/00; C10G 15/00
[52] U.S. Cl. .................................. 208/164; 208/108; 208/113; 208/127; 208/134; 208/149; 208/152; 208/213
[58] Field of Search ............... 208/149, 152, 164, 127; 209/212, 213, 214

[56] References Cited

U.S. PATENT DOCUMENTS

| 2,471,078 | 5/1949 | Ogorzaly | 208/152 |
|---|---|---|---|
| 2,742,403 | 4/1956 | Nicholson et al. | 208/164 |
| 2,844,522 | 7/1958 | Rex et al. | 208/127 |
| 2,899,384 | 8/1959 | Swabb et al. | 208/164 |
| 3,440,731 | 4/1969 | Tuthill | 208/155 |

*Primary Examiner*—Delbert E. Gantz
*Assistant Examiner*—G. E. Schmitkons
*Attorney, Agent, or Firm*—Roy J. Ott; Llewellyn A. Proctor

[57] ABSTRACT

A hydrocarbon conversion process wherein a hydrocarbon feedstock is contacted with a magnetically stabilized fluid bed of particulate solids comprising a mixture of separate, discrete (a) magnetizable substantially non-catalytic particles, and (b) non-magnetizable catalytic particles. The particulate solids mixture is withdrawn from the magnetically stabilized, fluidized bed and separated into magnetizable, substantially non-catalytic particles and non-magnetizable catalyst particles. The non-magnetizable catalytic particles are thereafter regenerated and returned to the hydrocarbon conversion zone. The separated magnetizable, substantially non-catalytic particles are subjected to heat transfer prior to their return to the conversion zone.

5 Claims, 1 Drawing Figure

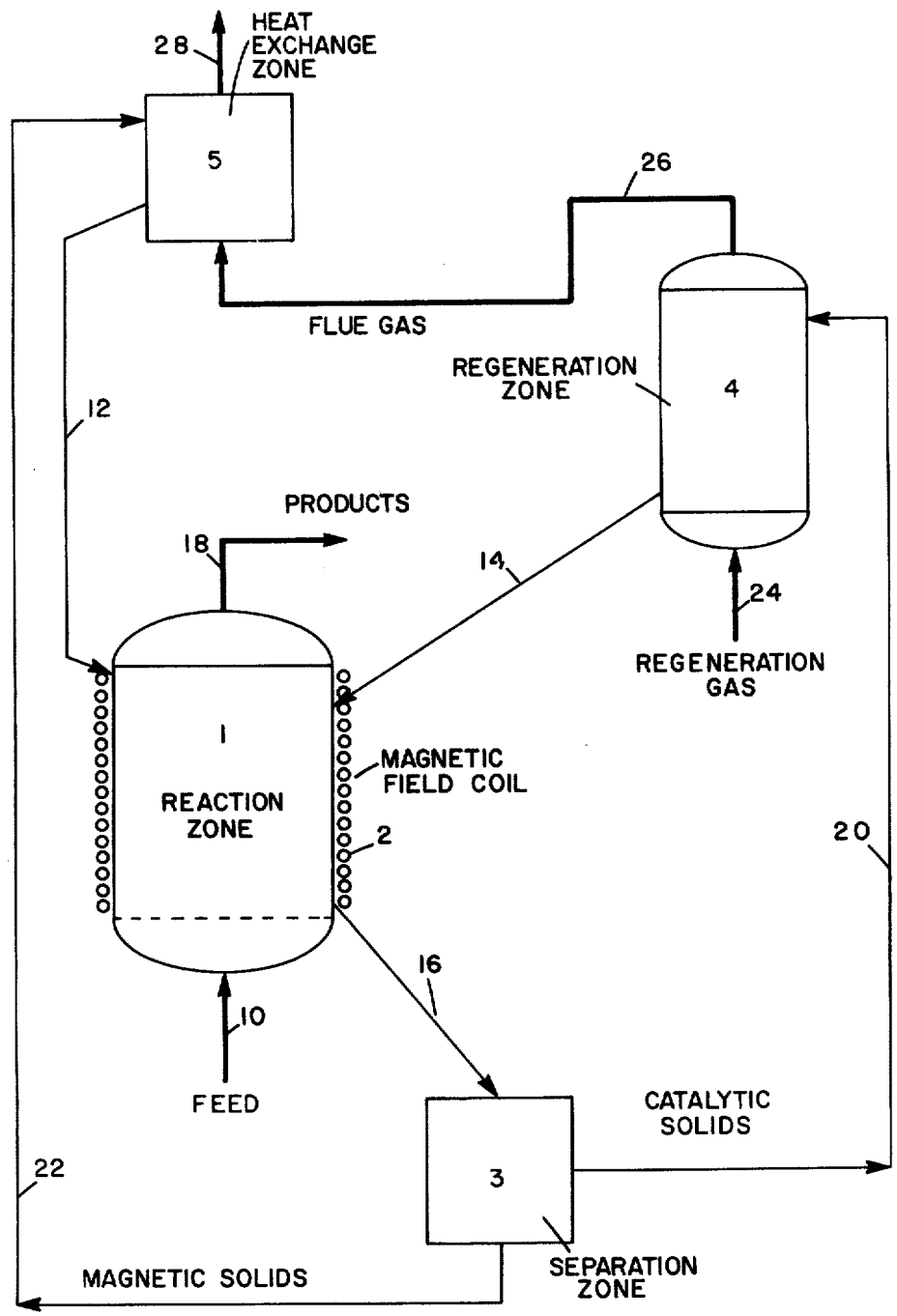

MAGNETICALLY STABILIZED, FLUIDIZED BEDS

This is a continuation of application Ser. No. 737,228, filed 11/1/76, abandoned.

FIELD OF THE INVENTION

This invention relates to a process and apparatus for effecting chemical conversion in a magnetically stabilized fluid bed. More particularly, the invention relates to a hydrocarbon conversion process wherein a feedstock is contacted with a fluidized solids mixture of magnetizable, substantially non-catalytic particles and nonmagnetizable catalytic particles in a reactor which is subjected to a magnetic field.

DESCRIPTION OF THE PRIOR ART

Many chemical and physical reactions such as catalytic cracking, hydrogenation, oxidation, reduction, drying, filtering, etc., are carried out in fluidized beds. A fluidized bed briefly consists of a mass of a particulate solid material in which the individual particles are in continuous motion relative to each other whereby the mass or fluidized bed possesses the characteristics of a liquid. Like a liquid, it will flow or pour freely, there is a hydrostatic head pressure, it seeks a constant level, it will permit the immersion of objects and will support relatively buoyant objects, and in many other properties it acts like a liquid. A fluidized bed is conventionally produced by effecting a flow of a fluid, usually gas, through a porous or perforate plate or membrane underlying the particulate mass, at a sufficient rate to support the individual particles in a relatively continuously moving manner. A minimum air flow or pressure drop is required to produce fluidization and is known as the incipient fluidization and is dependent on many parameters including particle size, particle density, etc. Any increase in the fluid flow beyond incipient fluidization causes an expansion of the fluidized bed to accommodate the increased fluid flow until the fluid velocity exceeds the free falling velocity of the particles which are then carried out of the apparatus.

Fluidized beds possess many desirable attributes, for example, in temperature control, heat transfer, catalytic reactions, and various chemical and physical reactions such as oxidation, reduction, drying, polymerization, coating, diffusion, filtering and the like. However, the establishment and maintenance of a stable fluidized bed by conventional procedures is a sensitive and difficult process possessing many drawbacks and disadvantages.

Among the problems associated with fluidized beds, a most basic one is that of bubble formation, frequently resulting in slugging, channeling, spouting and pneumatic transport; this problem is most common in gasfluidized systems. The problem necessitates critical flow control and effects design factors such as minimum fluidization velocities, pressure drops, particle sizes, etc. Bubbling causes both chemical and mechanical difficulties: for example, in gas-solids reactions gas bubbles may bypass the particles altogether which lowers contacting efficiency.

Ideally, a fluidized bed should be free of bubbles, homogeneous, maintain particle suspension, and manifest non-critical flow velocity control for various bed heights and bed densities. Many procedures and systems have been proposed to effect improvements, for example, by the use of baffles, gas distribution perforated plates, mechanical vibration and mixing devices, the use of mixed particle sizes, gas plus liquid flow schemes, special flow control valves, etc.

More recently, it has been disclosed in U.S. Pat. Nos. 3,304,249; 3,440,731; and 3,439,899 that certain improvements in fluidized beds can be effected by applying a magnetic field to a fluidized bed of particulate solids having ferromagnetic properties.

In general, the use of a magnetically stabilized, fluidized bed minimizes solids back mixing and eliminates gas by-passing of the fluidized solids by preventing gas bubble formation. The elimination of back mixing in certain operations such as cat cracking, reforming, hydrofining, hydrocracking, separation, sieving, drying, etc., is particularly advantageous since it prevents back mixing of feed and products, and thereby results in a greater selectivity to desirable products. Unfortunately, the advantages associated with the elimination of back mixing are partially offset by the poorer heat transfer due to less violent agitation of the fluidized solid particles. Such a decrease in heat transfer could cause hot spots on the catalyst particles and lead to deactivation of the catalyst. In addition, temperature control may be more difficult in certain reactions such as catalytic cracking, catalytic reforming, hydrocracking, hydrogenating, etc., which are highly exothermic or endothermic in nature.

The problems associated with the use of a magnetically stabilized, fluidized bed as regards heat transfer deficiencies are minimized or eliminated by the process of the present invention which utilizes a particulate solids mixture containing a plurality of separate, discrete (1) magnetizable substantially non-catalytic particles, and (2) non-magnetizable catalytic particles.

SUMMARY OF THE INVENTION

In a hydrocarbon conversion process wherein fluidizable particulate catalyst solids are continuously circulated between a fluidized bed reaction zone in which said particulate catalyst solids are contacted with a hydrocarbon feedstock resulting in the deposition of coke on said catalyst solids and a fluidized bed regeneration zone in which the catalyst particles having coke deposited thereon are contacted with an oxygen-containing gas to remove said coke by combustion, the improvement which comprises (a) introducing into said reaction zone particulate solids having ferromagnetic properties so that said hydrocarbon feedstock is contacted with a particulate solids mixture containing a plurality of separate, discrete (1) magnetizable substantially non-catalytic particles, and (2) non-magnetizable catalytic particles; (b) applying a magnetic field to said reaction zone to form a magnetically stabilized fluid bed in said reaction zone; (c) withdrawing said particulate solids mixture from the reaction zone; (d) separating said magnetizable substantially non-catalytic particles from said non-magnetizable catalytic particles; and (e) returning said non-magnetizable catalytic solids to said regeneration zone. In order to compensate for heat effects in the reactor, the magnetizable substantially non-catalytic particles and the non-magnetizable catalytic particles can be circulated through the system at different rates. In addition, the present invention contemplates the use of the heat exchanger to remove or add heat to the magnetizable non-catalytic particles.

The substantially non-catalytic particles which comprise the particulate solids mixture are magnetizable solids. By substantially non-catalytic is meant that the particles exert no catalytic influence on the chemical reaction occurring in the reaction zone. These substantially non-catalytic particles include ferromagnetic and ferrimagnetic substances including but not limited to magnetic $Fe_3O_4$, γ-iron oxide ($Fe_2O_3$), chromium dioxide, ferrites of the form $MO.Fe_2O_3$, wherein M is a metal or mixture of metals such as Zn, Mn, Cu, etc.; ferromagnetic elements including iron, nickel, cobalt and gadolinium, alloys of ferromagnetic elements, etc. The larger the magnetization of the particle, the higher will be the transition velocity up to which the bed may be operated without bubbling, all other factors held constant. Preferably, the particle will have magnetization of at least 50 gauss, more preferably 250 gauss or greater.

The non-magnetizable catalytic particles will be chosen to effect the reaction desired. Accordingly, the non-magnetizable catalytic particles of the invention will include a vast number of conventional catalysts which are known to catalyze the desired reaction. Examples of catalysts useful herein include those catalysts conventionally employed in such processes as fluid catalytic cracking, reforming, hydrogenation, hydrocracking, isomerization, alkylation, polymerization, oxidation, etc.

The fluid catalytic cracking catalysts which may be used in the process of the invention include the highly active zeolite-containing catalysts and the amorphous silica-alumina catalysts.

In general, the zeolite-type catalysts are exemplified by those catalysts wherein a crystalline aluminosilicate is dispersed with a siliceous matrix. Among the well recognized types of zeolites useful herein are the "Type A", "Type Y", "Type X", "Type ZSM", mordenite, faujasite, erionite, and the like. A further description of these zeolites and their methods of preparation are given, for example, in U.S. Pat. Nos. 2,882,243; 2,882,244; 3,130,007; 3,410,808; 3,733,390; 3,827,968, and patents mentioned therein, are incorporated herein by reference. Because of their extremely high activity, these zeolite materials are deposited with a material possessing a substantially lower level of catalytic activity such as a siliceous matrix material which may be of the synthetic, semi-synthetic or natural type. The matrix materials may include silica-alumina, silica-gel, silica-magnesia, alumina and clays such as montmorillonite, kaolin, etc.

The zeolite which is preferably incorporated into the matrix is usually exchanged with various cations to reduce the alkali metal oxide content thereof. In general, the alkali metal oxide content of the zeolite is reduced by ion exchange treatment with solutions of ammonium salt, or salts of metals in Groups II to VIII of the Periodic Table or the rare earth metals. Examples of suitable cations include hydrogen, ammonium, calcium, magnesium, zinc, nickel, molybdenum and the rare earths such as cerium, lanthanum, praseodymium, neodymium, and mixtures thereof. The catalyst will typically contain 2–25% of the zeolite component and 75–98% of the matrix component. The zeolite will usually be exchanged with sufficient cations to reduce the sodium level of the zeolite to less than 5 wt. %, preferably less than 1 wt. %. Other specific examples of these types of catalysts are found, for example, in U.S. Pat. Nos. 3,140,249; 3,140,251; 3,140,252, and 3,140,253, which are incorporated herein by reference.

When used in hydrotreating or hydrofining reactions the catalyst component will contain a suitable matrix component, such as those mentioned heretofore and one or more hydrogenating components comprising the transitional metals, preferably selected from Groups VI and VIII of the Periodic Table. Examples of suitable hydrogenating metals which may be supported upon a suitable matrix include, among others, nickel, cobalt, molybdenum, tungsten, platinum, and palladium, ruthenium, rhenium, iridium (including the oxides and sulfides thereof). Mixtures of any two or more of such hydrogenating components may also be employed. For example, catalysts containing (1) nickel or cobalt, or the combination thereof, in the form of metal, oxide, sulfide or any combination thereof, and (2) molybdenum or tungsten, or the combination thereof, in the form of metal, oxide, sulfide or any combination thereof are known hydrofining catalysts. The total amount of hydrogenating component supported on the matrix may range from 2 to 25 wt. %, (calculated as metal) usually 5 to 20 wt. % based on the total weight of the catalyst composition. A typical hydrofining catalyst includes 3 to 8 wt. % CoO and/or NiO and about 8 to 20 wt. % $MoO_3$ and/or $WO_3$ (calculated as metal oxide).

Examples of reforming catalysts which may be used in accordance with the invention are those catalysts comprising a porous solid support and one or more metals (or compounds thereof, e.g. oxides) such as platinum, iridium, rhenium, palladium, etc. The support material can be a natural or a synthetically produced inorganic oxide or combination of inorganic oxides.

Typical acidic inorganic oxide supports which can be used are the naturally occurring aluminum silicates, particularly when acid treated to increase the activity, and the synthetically produced cracking supports, such as silica-alumina, silica-zirconia, silica-alumina-magnesia, and crystalline zeolitic aluminosilicates. Generally, however, reforming processes are preferably conducted in the presence of catalysts having low cracking activity, i.e., catalysts of limited acidity. Hence, preferred carriers are inorganic oxides such as magnesia and alumina. Other examples of suitable reforming catalysts are found in U.S. Pat. Nos. 3,415,737; 3,496,096; 3,537,980; 3,487,009; 3,578,583; 3,507,780; and 3,617,520, which are incorporated herein by reference.

Preferably, the particles which are fluidized in the process of this invention will range in particle size of from 0.001 mm to 50 mm, more preferably from 0.15 mm to 1.0 mm. Particles of greater dimensions will be difficult, of course, to fluidize, while smaller size particles will be difficult to contain in any fluidized process.

The particulate solids mixture of the invention may comprise various amounts of the magnetizable substantially non-catalytic particles and non-magnetizable catalytic particles. In general, the particulate solids mixture will contain 1 to 75, preferably 5 to 50 volume % of the magnetizable substantially non-catalytic particles and 25 to 99, preferably 50 to 95 volume % of the non-magnetizable catalytic particles. The particulate solids mixture is withdrawn from the reaction zone and separated. Separation can be by well known means, such as magnetic means, elutriation, screening, settling, etc. The separation device may be integral with or external to the reactor. Spent catalyst is sent to the regenerator which may be a fixed bed, fluid bed, or a moving bed.

The feedstocks suitable for conversion in accordance with the invention include any of the well known feeds conventionally employed in hydrocarbon conversion processes. Usually they will be petroleum derived, although other sources such as shale oil and coal are not to be excluded. Typical of such feeds are heavy and light virgin gas oils, heavy and light virgin naphthas, solvent extracted gas oils, coker gas oils, steam-cracked gas oils, middle distillates, steam-cracked naphthas, coker naphthas, cycle oils, deasphalted residua, etc.

The operating conditions to be employed in the practice of the present invention are well known and will, of course, vary with the particular conversion reaction desired. The following table summarizes typical reaction conditions effective in the present invention.

| Principal Conversion Desired | Reaction Conditions | | | |
|---|---|---|---|---|
| | Temp., °F. | Pressure, p.s.i.g. | Feed Rate V/V/Hr. | Hydrogen Rate s.c.f./ bbl. |
| Hydrofining | 500–800 | 50–2,000 | 0.1–10.0 | 500–10,000 |
| Hydrocracking | 450–850 | 200–2,000 | 0.1–10.0 | 500–10,000 |
| Catalytic Cracking | 700–1,000 | 0–50 | 0.1–20.0 | 0 |
| Catalytic Reforming | 850–1,000 | 50–1,000 | 0.1–20.0 | 500–10,000 |

The separated non-catalytic magnetizable solids are recycled to the reactor. In order to compensate for heat effects in the reactor, the magnetizable non-catalytic solids and the non-magnetizable catalytic particles can be circulated at different rates. A heat exchanger can be placed in the magnetic solids stream to provide either heating or cooling.

The application of a magnetic field to the reaction zone in accordance with the invention is not to be limited to any specific method of producing the magnetic field. Conventional permanent magnets and/or electromagnets can be employed to provide the magnetic field used in the practice of this invention. The positioning of the magnets will, of course, vary with the solids used, degree of fluidization required and the effects desired. In the preferred embodiment of this invention, a toroidally shaped electromagnet is employed to surround at least a portion of the fluidized bed as this provides those skilled in the art with an excellent method of achieving near uniform magnetic force and stability throughout the bed. Such electromagnets when powered by direct current with the use of a rheostat are particularly desirable for applying a magnetic field around the bed particles and to provide an excellent method of stabilizing the fluidization of the bed particles in response to changing flow rates of the fluidizing medium.

The invention is not limited by the shape or positioning of the magnet employed to produce the magnetic field. The magnets employed in this invention can be placed within or without the vessel and may even be employed as an integral portion of the vessel structure itself. The process can be readily adopted for use in reactors currently employed by industry.

The degree of magnetic field to be applied to the fluidized solids in the reaction zone will, of course, depend on the desired magnetization for the ferromagnetic particles and the amount of stabilization desired. Particulate solids having weak ferromagnetic properties, e.g. cobalt, nickel, etc. will require the application of a stronger magnetic field than particulate solids having strong ferromagnetic properties, e.g., iron, to achieve similar stabilization effects. The size and shape of the solids will also obviously have an effect on the strength of the magnetic field to be employed. However, since the strength of the field produced by an electromagnet can be finely adjusted by adjusting the field strength of the electromagnet, an operator can readily adjust the field strength employed to achieve the desired degree of stabilization for the particular system employed. Magnetic field strength can also be adjusted by changing the distance of the magnet to the bed. Specific methods of applying the magnetic field are also described in U.S. Pat. Nos. 3,440,731 and 3,439,899, and Belgium Pat. No. 834,384, which are incorporated herein by reference.

BRIEF DESCRIPTION OF THE DRAWING

The FIGURE is a diagrammatic flow plan illustrating one embodiment of the invention.

PREFERRED EMBODIMENTS OF THE INVENTION

EXAMPLE 1

A preferred embodiment of the invention will be described with reference to the accompanying FIGURE showing a flow plan of a catalytic cracking operation.

Referring to the FIGURE, a light Arabian gas oil feed, ferromagnetic non-catalytic particles, and non-magnetic catalytic particles are introduced into the reaction zone of cat cracker reactor 1 via lines 10, 12, and 14, respectively. Reactor 1 is surrounded by electromagnetic coil 2 which is powered by a direct current source (not shown). Electromagnetic coil 2 is arranged to apply a substantially uniform field on the total particulate solids charge in reactor 1. In this particular example, electromagnetic coil 2 gives a uniform magnetic field of 350 Oersteds.

The ferromagnetic, non-catalytic particles employed in reactor 1 are stainless steel particles consisting of stainless steel (400 series). The catalyst which is introduced into reaction 1 via line 14 is a conventional cracking catalyst which is a rare earth exchanged Y-type zeolite containing about 4.0 wt. % $Re_2O_3$ and sold under the trade name CBZ-1.

The hydrocarbon conversion products from reactor 1 are withdrawn via line 18 and later condensed and distilled for separation into various products. The spent catalytic particles and the ferromagnetic particles are withdrawn from reactor 1 via line 16 and sent to separation zone 3 where the catalyst and ferromagnetic particles are separated by elutriation using steam to carry the light catalyst particles overhead and to permit the heavier stainless steel heat carrier particles to settle out. The separated catalytic particles are withdrawn from separation zone 3 via line 20 and introduced into the regeneration zone of regenerator 4 wherein the spent catalyst is conventionally regenerated by burning the coke deposited thereon in the presence of air which is introduced into regenerator 4 by means of line 24. Flue gas and regenerated catalyst from regenerator 4 exit via lines 26 and 14, respectively. The ferromagnetic solids from separation zone 3 are withdrawn by line 22 for introduction into heat exchange zone 5 wherein the ferromagnetic particles are in heat exchange contact with the hot flue gas (about 800°–1400° F.) introduced into heat exchange zone 5 by line 26. The flue gas exits from heat exchange zone 5 via line 28. The ferromagnetic particles which have been heated by contact with the hot flue gas are removed from heat exchange zone 5 via line 14 for delivery to reactor 1.

The operating conditions and yields for the aforedescribed process scheme are shown in Table I below.

TABLE I

| Conditions and Yields for Catalytic Cracking Operation | |
| --- | --- |
| Reactor Conditions | |
| Temperature | 950° F. |
| Pressure | 35 psig |
| Feed Rate, W/H/W | 40 |
| Catalyst/Oil, Weight Ratio | 4.3 |
| Vol. % Ferromagnetic Particles | 20 |
| Vol. % Catalyst Particles | 80 |
| Catalyst Particle Size | 50–100 Microns |
| Ferromagnetic Particle Size | 20–30 Microns |
| Velocity | 2 Ft./Sec. |
| Applied Field | 360 Oersteds |
| Ferromagnetic Particles/Oil, Weight Ratio | 7.0 |
| Regenerator Conditions | |
| Temperature | 1205° F. |
| Pressure | 35 psig |
| Air Rate | 140 Kilo SCFM |
| Reactor Yields | |
| $H_2S$, Wt. % | 1.2 |
| $C_1/C_2$, Wt. % | 2.6 |
| $C_3$, Vol. % | 7.4 |
| $C_4$, Vol. % | 13.1 |
| $C_5$/430, Vol. % | 55.4 |
| 430/650, Vol. % | 22.1 |
| 750$^+$, Vol. % | 9.8 |
| Coke, Wt. % | 4.7 |

EXAMPLE 2

Another operation that can be carried out in the system of the present invention is catalytic reforming using process steps similar to those described above but with different specific process conditions. Conditions for processing a 160°/350° F. light Arabian naphtha with a reforming catalyst containing 0.3 wt. % Pt and 0.3 wt. % Re on an alumina base are given below in Table II.

TABLE II

| REFORMING CONDITIONS AND YIELDS | |
| --- | --- |
| Severity | 100$^+$ RON Clear |
| Recycle Gas Rate | 4000 SCF/B |
| Reactor Conditions | |
| Temperature, °F. | 915–962 |
| Pressure, psig | 210 |
| Solids Circulation: Kilo lb./hr. | |
| Catalyst Particles | 8.62 |
| Ferromagnetic Particles | 6.38 |
| Velocity, Ft./Sec. | 1.3–1.7 |
| Particle Size, Microns | |
| Catalyst Particles | 50–100 |
| Ferromagnetic Particles | 20–50 |
| Applied Field, Oersteds | 500 |

TABLE II-continued

| REFORMING CONDITIONS AND YIELDS | |
| --- | --- |
| Reactor Yields: | |
| $H_2$ | 2.7 Wt. % |
| $C_1$ | 1.4 Wt. % |
| $C_2$ | 2.7 Wt. % |
| $C_3$ | 3.3 Wt. % |
| $iC_4$ | 1.8 Wt. % |
| $nC_4$ | 2.7 Wt. % |
| $C_5^+$ | 85.4 Wt. % |

What is claimed is:

1. In a hydrocarbon conversion process wherein fluidizable particulate catalyst solids are circulated between a fluidized bed reaction zone in which said particulate catalyst solids are contacted with a hydrocarbon feedstock resulting in the deposition of coke on said catalyst solids and a fluidized bed regeneration zone in which the catalyst particles having coke deposited thereon are contacted with an oxygen-containing gas to remove said coke by combustion, the improvement which comprises (a) introducing into said reaction zone particulate solids having ferromagnetic properties so that said hydrocarbon feedstock is contacted with a particulate solids mixture containing a plurality of separate, discrete (1) magnetizable substantially non-catalytic particles, and (2) non-magnetizable catalytic particles; (b) applying a magnetic field to said reaction zone to form a magnetically stabilized fluid bed in said reaction zone; (c) withdrawing said particulate solids mixture from the reaction zone; (d) separating said magnetizable substantially non-catalytic particles from said non-magnetizable catalytic particles; and introducing said non-magnetizable catalytic particles into said regeneration zone.

2. In the hydrocarbon conversion process of claim 1, the improvement comprising circulating said magnetizable particles to a heat exchange means.

3. In the hydrocarbon conversion process of claim 2, the improvement comprising contacting said magnetizable solids with the combustion gases from said regeneration zone to heat said magnetizable solids and thereafter introducing said heated magnetizable solids into said fluidized bed reaction zone.

4. In the hydrocarbon conversion process of claim 2, the improvement wherein said magnetic field is uniform and oriented substantially axially to the flow of fluid in said reaction zone.

5. In the hydrocarbon conversion process of claim 4, the improvement wherein said particulate solids mixture comprises 5 to 50 vol. % of the magnetizable non-catalytic particles and 50 to 95 vol. % of the non-magnetizable catalytic particles.

* * * * *